UNITED STATES PATENT OFFICE.

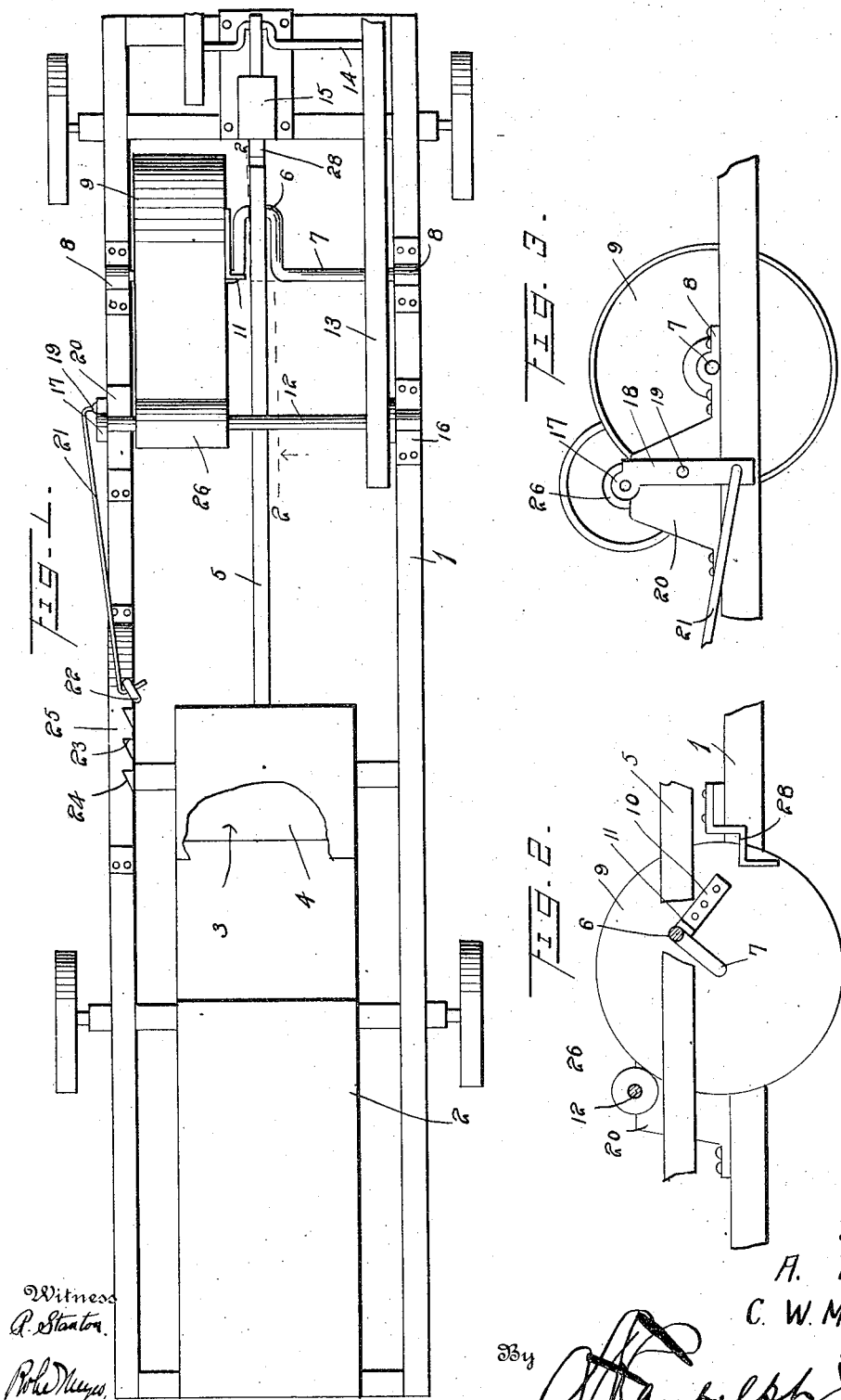

ALVAH PAYNE AND CHARLES W. McFARLANE, OF ORANGE, TEXAS.

HAY-PRESS.

1,255,041.　　　　　　Specification of Letters Patent.　　Patented Jan. 29, 1918.

Application filed April 27, 1916. Serial No. 93,934.

*To all whom it may concern:*

Be it known that we, ALVAH PAYNE and CHARLES W. MCFARLANE, citizens of the United States, residing at Orange, in the county of Orange and State of Texas, have invented certain new and useful Improvements in Hay-Presses; and we do hereby declare the following to be a full, clear, and exact description of the invention, such as will enable others skilled in the art to which it appertains to make and use the same.

This invention relates to a hay press, and the primary object of this invention is to provide a novel construction for operating the compressing head or plunger of a press, which structure is extremely simple in construction, durable and easy to operate.

More specifically the object of this invention is to provide a structure for operating the plunger or compressing head of a hay press which includes a crank shaft having a relatively large friction drum loosely mounted thereon, means carried by the friction drum for engaging the crank shaft and partly rotating it during the rotation of the friction drum, and a friction drum which is operatively connected to a prime mover, and adapted for movement into or out of engagement with the friction drum for rotating the latter by the operation of the prime mover.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a top plan view of a hay baler employing the improved operating means, Fig. 2 is a fragmentary section taken on the line 2—2 of Fig. 1, and Fig. 3 is a fragmentary side elevation of the operating mechanism.

Referring more particularly to the drawing, 1 designates a supporting frame of the hay press which has a baling chamber 2 carried thereby, and a plunger structure 3 for compressing the hay within the baling chamber 2. The plunger structure 3 includes the usual type of baling head 4 and rod 5 which is connected to the head and extends rearwardly thereof substantially equidistant of the side rails of the supporting frame 1. The plunger rod 5 is connected to the wrist 6 of a crank shaft 7, a short distance inwardly from the rear end of the plunger as clearly shown in the drawing. The crank shaft 7 is rotatably supported by suitable bearings 8 which are in turn supported by the supporting frame 1 and it has a friction drum 9 loosely mounted thereon. A plate 10 is attached to the inner surface of the friction drum 9 and it has one end angled as shown at 11, for engaging a portion of the crank of the crank shaft 7 and partially rotating the crank shaft by the rotation of the friction drum 9.

A shaft 12 is provided, which is operatively connected through the means of power transmitting structure 13 to the main drive shaft 14 of a prime mover 15, of any ordinary construction, which is carried by the supporting frame 1. The shaft 12 has one end rotatably supported by a bearing 16 and the other end rotatably supported by a bearing 17 which is formed upon the upper end of an arm 18. The arm 18 is pivotally connected as shown at 19 to a pillow block 20, and it has a rod 21 connected to its lower end. The rod 21 extends longitudinally of the frame 1 and is connected to a hand lever 22, which hand lever is pivoted in any suitable manner to the frame 1 and is provided for engagement with a square shoulder 23 of notches 24 formed in a quadrant 25 for holding the lever in various adjusted positions, which will also hold the bracket arm 18 in adjusted pivotal position. A friction wheel 26 is mounted upon the shaft 12 and it is adapted for frictional engagement with the periphery of the drum 9, for rotating the drum 9 by the operation of the prime mover 15.

A resilient or spring stop 28 is carried by the supporting frame 1 and it is positioned for buffeting the force of the movement of rear end of the plunger rod 5 upon the rear stroke of the plunger rod.

In the operation of the improved hay press; the plunger structure 3 is moved forwardly, by the rotation of the crank shaft 7, which rotation is caused by the engagement of the angled end 11 of the plate 10 with the crank of the shaft 7 as shown in Fig. 2 of the drawing so that the rotation of the friction drum will rotate the crank shaft sufficiently to force the plunger structure 3 forwardly for compressing hay within the chamber 2. After the friction drum 9 has rotated sufficient distance to force the plunger 3 to the limit of the inward movement, the angled end 11 will move out of engagement with the crank 6, and the expansion of the compressed hay within the chamber will be sufficient to force the plunger structure 3 rearwardly to its initial position, prior to its forward operation by the rotation of the friction wheel. The rearward movement of the plunger structure 3 is checked by the resilient stop 28.

The operation of the friction drum 9 and consequently the plunger structure 3 is controlled by the operation of the lever 22 which controls the pivotal movement of the arm 18 and consequently the movement of the friction wheel 26 into or out of peripheral frictional engagement with the friction drum 9.

What is claimed is:—

In a device as set forth, a supporting frame, a driven friction drum, a shaft rotatably supported by said frame and being mounted to permit of the limited pivotal movement, a driving friction wheel carried by said shaft and adapted for frictonal engagement with said driven friction drum, an arm pivotally supported by said supporting frame, one end of said shaft rotatably carried by said arm, a rod connected to said arm, a hand lever connected to said rod for rocking said arm for moving said friction wheel into or out of engagement with said friction drum.

In testimony whereof we affix our signatures in presence of two witnesses.

ALVAH PAYNE.
CHARLES W. McFARLANE.

Witnesses:
O. H. CADLE.
J. E. ROBERTS.

Copies of this patent may be obtained for five cents each, by addressing the "Commissioner of Patents, Washington, D. C."